Sept. 21, 1926.

C. W. AIKEN

EVAPORATOR

Filed May 17, 1923

INVENTOR
Charles W. Aiken
BY
ATTORNEY

Sept. 21, 1926.  
C. W. AIKEN  
EVAPORATOR  
Filed May 17, 1923  
1,600,784  
2 Sheets-Sheet 2

INVENTOR  
Charles W. Aiken  
ATTORNEY

Patented Sept. 21, 1926.

1,600,784

UNITED STATES PATENT OFFICE.

CHARLES W. AIKEN, OF NEW YORK, N. Y.

EVAPORATOR.

Application filed May 17, 1923. Serial No. 639,672.

My invention relates to apparatus particularly intended for use in the manufacture of soap.

The main object is to provide simple, compact, reliable, and efficient apparatus. A specific object is to provide a simple construction by which steam may be twice utilized in separate evaporators. Another specific object is to permit of a reverse in the flow of the steam. Although double effect and reverse in the flow apparatus have been heretofore proposed, all of the constructions with which I am familiar are more or less cumbersome and unsatisfactory and are not only expensive but take up a very large amount of space and require complicated piping and excessive number of valves.

I accomplish the desirable results by a very simple combination of two evaporators and two separators with connecting pipes and valves which may be adjusted so as to obtain double effect operation and permit of flow in either of two directions.

Figure 1:
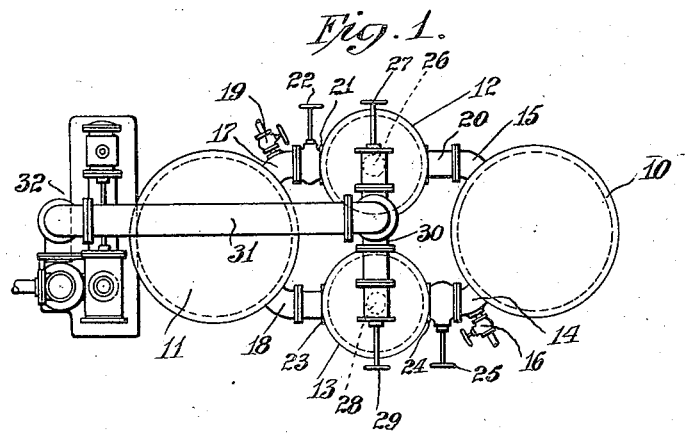
Figure 1 is a plan view of apparatus embodying the improvements of my invention.
Figure 2:
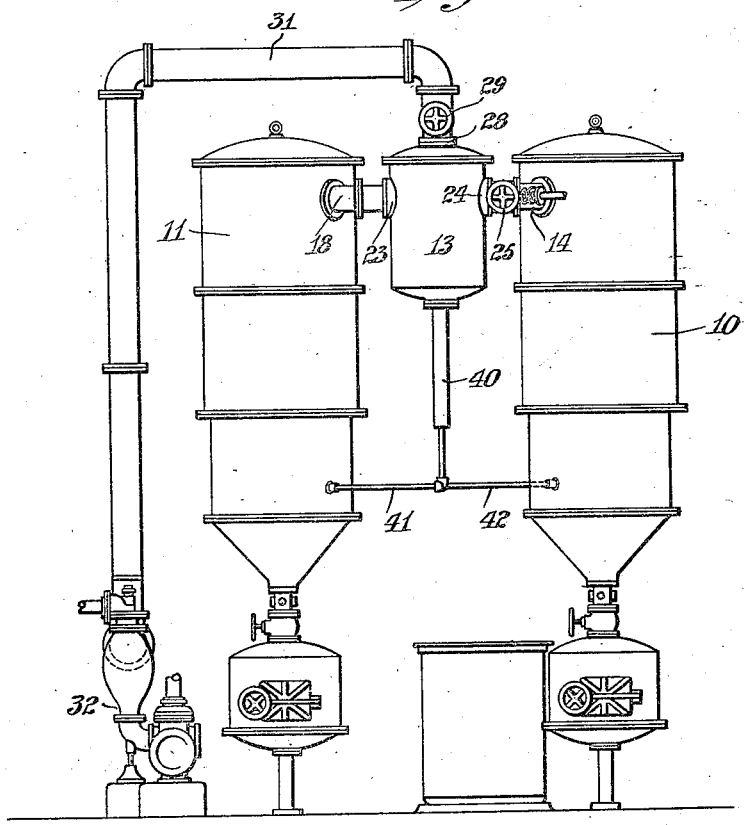
Fig. 2 is a side view of the same.

The evaporators 10 and 11 may be of any suitable type adapted to be filled and emptied in any suitable manner. The separators 12 and 13 may also be of any suitable type. Each evaporator has a steam inlet and a vapor outlet near the top as at 14 and 15 respectively. The admission of steam to the evaporator 10 is controlled by a valve 16. The evaporator 11 has an inlet 17 and an outlet 18. The admission of steam is controlled by the valve 19.

The separator 12 has an inlet 20 and outlet 21. The outlet is controlled by a valve 22. The separator 13 has an inlet 23 and an outlet 24, the latter being controlled by a valve 25. The separator 12 has a supplemental outlet 26 which is preferably arranged in the top and the flow from this outlet is controlled by the valve 27. The outlet 28 from the other separator 13 is controlled by a valve 29. For convenience in construction, installation, and control, I prefer to have the outlets 26 and 28 discharge through a connecting conduit 30 and an outlet conduit 31, which is connected to the vacuum pump 32.

Each separator is preferably provided with a baffle plate 35 which may be provided with a collar 36 for convenient attachment to the inside of the cover of the separator. This baffle plate is preferably provided with ribs or corrugations and a drainage trough 37 at the bottom leading to the outlet pipes 38—38. Preferably the baffle plate 35 is so constructed and arranged that the steam which enters through the inlet 20 must pass around the edges of the baffle plate in order to escape through the outlet 21. The baffle is also so constructed as to permit of the escape of steam from the rear of the baffle plate only, through the passage 39 to the outlet 26. Liquid which is carried over with the steam into the separator collects on the plate 35 and drains down into the bottom of the separator and through the pipe 40 into one or the other of the evaporators. In this instance the separator 13 drains through the pipe 41 into the evaporator 11 and the separator 12 drains through the pipe 42 into the evaporator 10.

Figure 3:
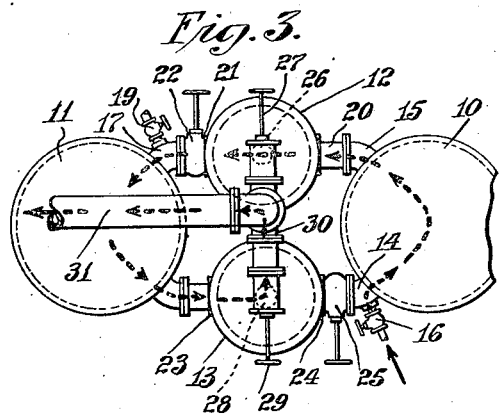
Fig. 3 is a more or less diagrammatic plan view indicating by dotted arrows the flow of steam in one direction.

With the valves 25, 27 and 19 closed, the flow of steam is through the various receptacles in the order indicated by the dotted arrows in Figure 3, namely through the evaporator 10, separator 12, evaporator 11, separator 13, and thence outward.

Figure 4:
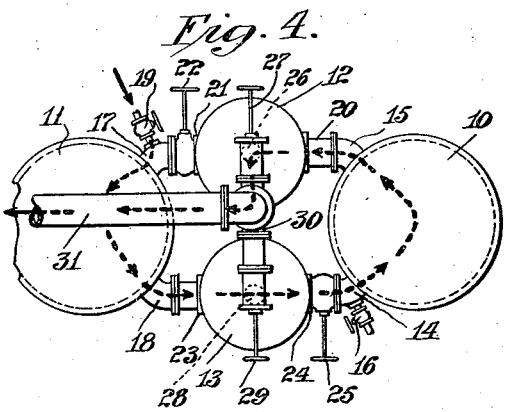
Fig. 4 is a similar view showing the reverse direction of flow.
Figure 5:
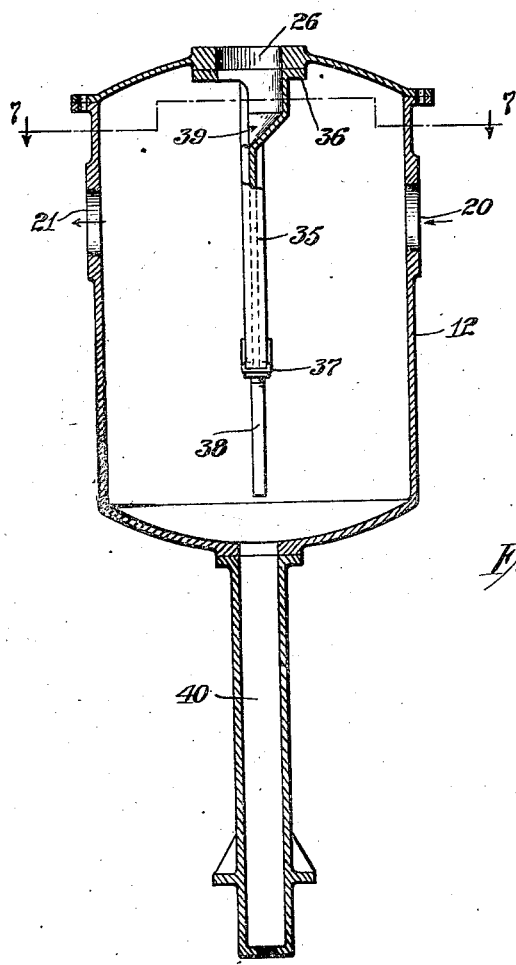
Fig. 5 is a vertical sectional view of one of the separators on a larger scale.
Figure 6:
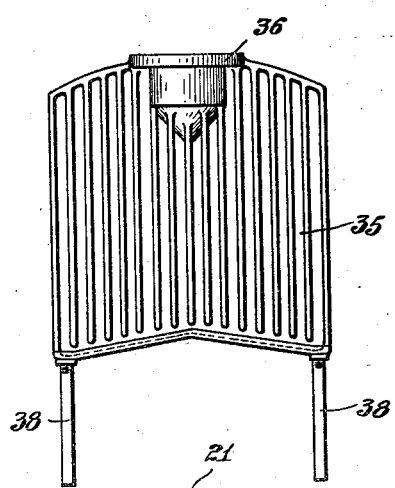
Fig. 6 is a side view of a baffle drain for one of the separators.
Figure 7:
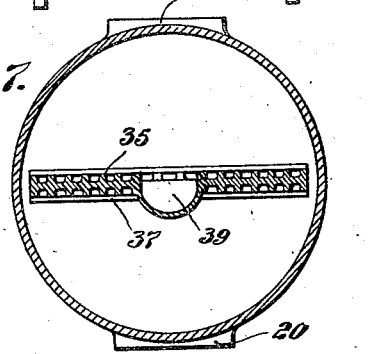
Fig. 7 is a horizontal sectional view of the separator on the plane of the line 7—7 of Figure 5.

With the valves 19, 25 and 27 open and the valves 16, 22, and 29 closed, the flow of steam is in the direction indicated by the dotted arrows in Figure 4, namely through the valve 19, evaporator 11, separator 13, evaporator 10, separator 12, and thence outward.

By this construction and arrangement it is possible to utilize the maximum capacity of the apparatus to its greatest advantage and by from time to time reversing the direction of the flow to keep the apparatus from fouling.

I claim:

1. Apparatus of the character described comprising the combination of two evaporators and two interposed separators with fixed connections and valves between the respective evaporators and separators by which steam may be caused to pass through one evaporator, one separator, the other evaporator, and the other separator, or first through the second evaporator, the second separator, the first evaporator, and the first separator.

2. Apparatus of the character described comprising two evaporators each having an inlet and an outlet with a steam valve in the inlet, two separators each having an inlet connected to one evaporator outlet and an outlet connected to the other evaporator inlet with a valve in the latter connection and a second valve controlled outlet for each of said separators for use when the valve in the connection with the next evaporator is closed.

3. Apparatus of the character described comprising the combination of two evaporators, two interposed separators with connections and valves between the respective separators and evaporators by which steam may be caused to pass through one evaporator, one separator, the other evaporator, and the other separator, or first through the second evaporator, the second separator; and an outlet conduit with connections with each of said separators and valves to open or close such connections to discharge the vapor from the last separator used.

4. A reversible multiple effect evaporator system comprising a chain of four receptacles connected in the following order, evaporator, separator, evaporator and separator, a valved connection between the last separator and the first evaporator, a valve in the connection between the first separator and the second evaporator, a valved steam inlet to each evaporator, and a valved outlet from each separator independent of the connection.

5. A reversible double effect evaporator comprising two evaporators and two separators connected between them, a suction outlet connecting said evaporators, a valve for the outlet from each evaporator, a steam inlet for each evaporator and a valve for controlling the passage from each separator to the next evaporator.

6. A reversible system of the character described comprising the combination of two evaporators, two separators and a common suction discharge with fixed connections and valves between the respective evaporators and separators and the discharge by which steam may be caused to pass through one evaporator, one separator, the other evaporator, and the other separator and thence to a suction discharge, or first through the second evaporator, the second separator, the first evaporator, and the first separator to the suction discharge.

7. A double effect system of the character described comprising two evaporators each having an inlet and an outlet with a steam valve in the inlet, two separators each having an inlet connected to one evaporator outlet and an outlet connected to the other evaporator inlet with a valve in the latter connection, a common discharge and a valve controlled outlet for each of said separators leading to said discharge for use when the valve in the connection with the next evaporator is closed.

8. A reversible system of the character described comprising the combination of two evaporators, two interposed separators on opposite sides of the center line of the evaporators with connections and valves between the respective separators and evaporators by which steam may be caused to pass through one evaporator, one separator, the other evaporator, and the other separator, or first through the second evaporator, the second separator; and a transverse outlet conduit above said separator with connections with each of said separators and valves to open or close such connections to discharge the vapor from the last separator used.

CHARLES W. AIKEN.